No. 749,643. Patented January 12, 1904.

UNITED STATES PATENT OFFICE.

GEORGE L. TELLER, OF CHICAGO, ILLINOIS.

BAKING-POWDER.

SPECIFICATION forming part of Letters Patent No. 749,643, dated January 12, 1904.

Application filed January 19, 1903. Serial No. 139,605. (No specimens.)

*To all whom it may concern:*

Be it known that I, GEORGE L. TELLER, a citizen of the United States of America, and a resident of Chicago, in the county of Cook and State of Illinois, have invented certain new and useful Improvements in Baking-Powders, of which the following is a specification.

The main object of my invention is to produce an effective baking-powder which will be free from tartaric acid, cream of tartar, alum, phosphate, and other injurious ingredients commonly contained in commercial baking-powders and which will contain no ingredients that are foreign to the human body.

My improved powder consists mainly of a protein in combination with hydrochloric acid. This is mechanically mixed with a carbonate which will be decomposed through the addition of water and will liberate carbon-dioxid gas. The protein with which I have had the best results is casein and milk-albumen, and the carbonate which seems to produce the most satisfactory results is bicarbonate of sodium.

In forming the compound I take one hundred parts of casein or other milk-protein, add twenty to twenty-five parts of chemically-pure hydrochloric acid having a specific gravity of 1.2 to 1.21, and add enough water to form a semisolid, the proportions being by weight. This is allowed to stand for a few hours, when the hydrochloric acid will form a lax chemical combination with the protein. The compound is then dried, preferably at a temperature of 40° to 75° centigrade, the dry mixture then being in pulverulent form. This compound is then mechanically mixed in the proportion of about three to four parts of the compound to one part of bicarbonate of sodium or other suitable carbonate.

When the compound is used for baking purposes, the addition of water will cause the slow discharge of the carbonic-acid gas from the bicarbonate of sodium.

If the mixture of casein and hydrochloric acid is dried at a high temperature, it will take on a pinkish cast and may become dark in color. This is objectionable mainly from the standpoint of appearance and may be avoided by drying at about the temperature hereinbefore mentioned. The physical nature of the casein or other protein is changed when combined with hydrochloric acid, so that same becomes more pulverulent and contains the hydrochloric acid in lax chemical combination with the protein.

What I claim as my invention, and desire to secure by Letters Patent, is—

1. As a new article of manufacture, a compound containing a mixture of milk-protein and hydrochloric acid in lax combination and in substantially dry and pulverulent form and containing an admixture of a carbonate, substantially as described.

2. As a new article of manufacture, a compound containing a mixture of milk-protein and hydrochloric acid, in lax combination and in substantially dry and pulverulent form and containing an admixture of bicarbonate of sodium.

3. As a new article of manufacture, a compound containing a mixture of milk-protein and hydrochloric acid in lax chemical combination and in substantially dry and pulverulent form with an intimate mechanical admixture of a carbonate, substantially as described.

4. As a new article of manufacture, a compound containing a mixture of casein and hydrochloric acid in lax chemical combination and in substantially dry and pulverulent form with an intimate mechanical mixture of bicarbonate of sodium, substantially as described.

Signed at Chicago this 16th day of January, 1903.

GEORGE L. TELLER.

Witnesses:
WM. R. RUMMLER,
JOHN A. WISENER.